US011218440B2

(12) United States Patent
Kandasamy et al.

(10) Patent No.: US 11,218,440 B2
(45) Date of Patent: Jan. 4, 2022

(54) CONTIGUOUS SUBNET IP ADDRESS ALLOCATION

(71) Applicant: Hewlett Packard Enterprise Development LP, Houston, TX (US)

(72) Inventors: Mohanraj Kandasamy, Santa Clara, CA (US); Shabaresha Hemaraju, Santa Clara, CA (US); Tarun Maharana, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/399,385

(22) Filed: Apr. 30, 2019

(65) Prior Publication Data
US 2020/0351238 A1 Nov. 5, 2020

(51) Int. Cl.
*H04L 29/12* (2006.01)
*H04L 12/24* (2006.01)
*H04L 12/66* (2006.01)

(52) U.S. Cl.
CPC .......... *H04L 61/2007* (2013.01); *H04L 12/66* (2013.01); *H04L 41/0893* (2013.01); *H04L 61/6068* (2013.01)

(58) Field of Classification Search
CPC . H04L 61/2007; H04L 12/66; H04L 41/0893; H04L 61/6068
See application file for complete search history.

(56) References Cited

U.S. PATENT DOCUMENTS

| 7,840,708 | B2 | 11/2010 | Smith |
| 8,856,360 | B2 | 10/2014 | Achan et al. |
| 10,841,121 | B1* | 11/2020 | Scoggins ............... G06Q 50/12 |
| 2004/0100934 | A1* | 5/2004 | Kachi ................. H04L 61/6068 370/338 |
| 2011/0238793 | A1* | 9/2011 | Bedare .................. H04L 45/586 709/220 |
| 2012/0089713 | A1* | 4/2012 | Carriere ................ H04L 61/609 709/222 |

(Continued)

OTHER PUBLICATIONS

RRFC2131—Dynamic Host Configuration Protocol (Droms et al); Mar. 1997 (Year: 1997).*

(Continued)

*Primary Examiner* — June Y Sison
(74) *Attorney, Agent, or Firm* — Hewlett Packard Enterprise Patent Department

(57) ABSTRACT

A method for contiguous allocation of Internet Protocol (IP) addresses includes receiving, by a gateway from a network device, a request for an IP address of a plurality of IP addresses, determining, by the gateway, whether the network device is an access point, in response to determining that the network device is an access point, assigning by the gateway, the IP address to the network device from a first contiguous range of the plurality of IP addresses, in response to determining that the network device is not an access point, assigning, by the gateway, the IP address to the network device from a second contiguous range of the plurality of IP addresses, wherein the first contiguous block and the second contiguous block are separate, after assigning and by the gateway, enforcing a policy for the network device based on the IP address of the network device.

20 Claims, 4 Drawing Sheets

(56) References Cited

U.S. PATENT DOCUMENTS

| | | | | |
|---|---|---|---|---|
| 2012/0314617 A1* | 12/2012 | Erichsen | ............. | H04L 61/6004 370/254 |
| 2013/0103836 A1* | 4/2013 | Baniqued | ............ | H04L 61/2015 709/226 |
| 2013/0201979 A1* | 8/2013 | Iyer | ....................... | H04W 84/12 370/338 |
| 2013/0305341 A1* | 11/2013 | Baker | ................. | H04L 41/0886 726/11 |
| 2013/0346564 A1* | 12/2013 | Warrick | .................. | H04L 65/60 709/219 |
| 2017/0195162 A1* | 7/2017 | Enrique Salpico | .......................... | H04L 29/06149 |

OTHER PUBLICATIONS

Configuring Address Pools, (Web Page), Retrieved Aug. 31, 2018, 19 Pgs.
SGT Exchange Protocol over TCP (SXP), (Web Page), Jan. 29, 2016, 12 Pgs.
Two Different IP Ranges to the same vLAN, (Web Page), Retrieved Aug. 31, 2018, 4 Pgs.

* cited by examiner

CONTIGUOUS SUBNET IP ADDRESS ALLOCATION

BACKGROUND

In some computer networks, access points (APs) or routers, in conjunction with other network devices, may provide network connectivity to client devices. The client devices may be laptops, personal computers, smartphones, etc. A network may provide connectivity to offices, residences, university campuses, etc.

Organizing and maintaining the network can be a challenging task—larger networks, such as those at corporate offices or university campuses, may have many Information Technology (IT) specialists and engineers working to maintain the network. These experts allow for complicated solutions to be deployed to solve network issues. However, many smaller networks do not have a full time IT employee to manage their network. The task may fall to someone who is not an expert. Improved, easier, solutions are needed.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
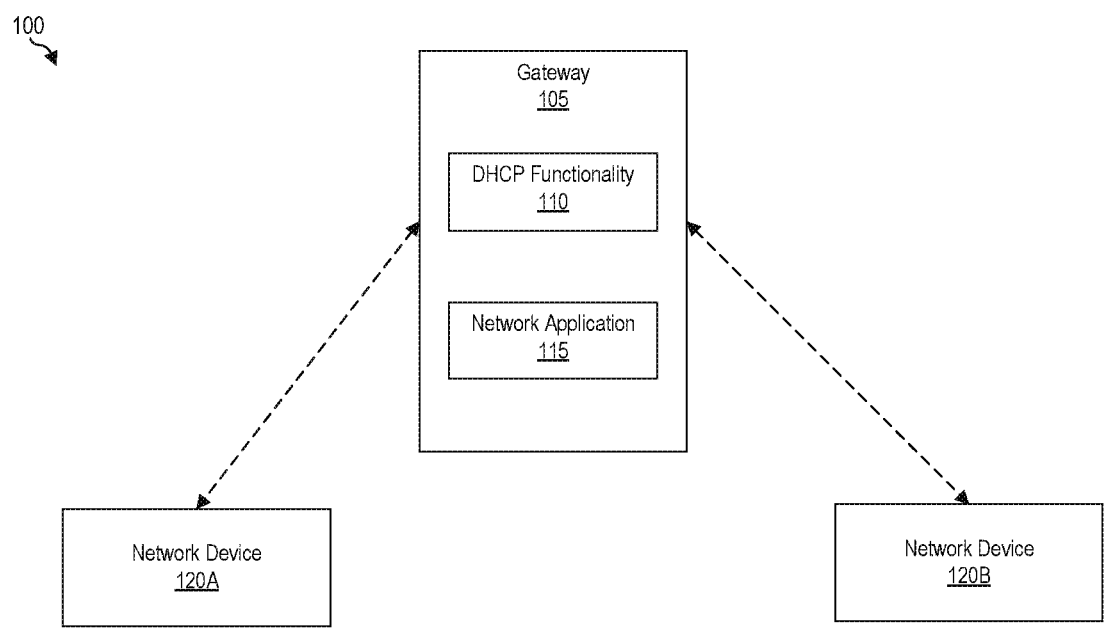
FIG. 1 is a block diagram of a system in accordance with one or more embodiments.

As noted above, setting up, managing, and troubleshooting a network can be extremely complicated. There are many different components—Access Points, Switches, Routers, Servers, laptops, desktops, mobile phones, beacons, Internet of Things (IoT) devices, etc. The different components might use different methods or formats of communication wired or wireless, Wi-Fi or Bluetooth, etc.

Generally, Virtual Local Area Networks (VLAN) have been used to help manage applications in enterprise networks. A VLAN is any broadcast domain that is partitioned and isolated in a computer network at the data link layer (Layer 2). VLANs work by applying tags to network frames and handling these tags in networking systems—creating the appearance and functionality of network traffic that is physically on a single network but acts as if it is split between separate networks. In this way, VLANs can keep network applications separate despite being connected to the same physical network, and without requiring multiple sets of cabling and networking devices to be deployed. VLANs may be applied to traditional LANs or to Wireless LANs (WLAN), or combinations thereof.

VLANs allow network administrators to group hosts together even if the hosts are not directly connected to the same network switch. Because VLAN membership can be configured through software, this can greatly simplify network design and deployment. Without VLANs, grouping hosts according to their resource needs necessitates the labor of relocating nodes or rewiring data links. VLANs allow networks and devices that must be kept separate to share the same physical cabling without interacting, improving simplicity, security, traffic management, or economy. For example, a VLAN could be used to separate traffic within a business due to users, and due to network administrators, or between types of traffic, so that users or low priority traffic cannot directly affect the rest of the network's functioning.

However, establishing and maintaining a VLAN may be beyond some user's abilities. Thus, there is a need for a simplified solution that offers many, or all, of the same benefits of a VLAN without using a VLAN. As described herein, the inventors have recognized that by assigning Internet Protocol (IP) addresses in contiguous ranges, and assigning certain types of devices into specific contiguous ranges of IP addresses, many, or all, of the benefits of a VLAN may be obtained without the effort of establishing and managing a VLAN.

IP addresses, of course, are a numerical label assigned to each device connected to a computer network that uses the Internet Protocol (IP) for communication. An IP address serves two principal functions: host or network interface identification and location addressing. Dynamic Host Configuration Protocol (DHCP) is a popular protocol whereby a DHCP server dynamically assigns an IP address and other network configuration parameters to each device on a network so they can communicate with other IP networks. A DHCP server enables computers to request IP addresses and networking parameters automatically from the Internet service provider (ISP), reducing the need for a network administrator or a user to manually assign IP addresses to all network devices. In the absence of a DHCP server, a computer or other device on the network needs to be manually assigned an IP address or utilize other available methods or options.

DHCP can be implemented on networks ranging in size from home networks to large campus networks and regional Internet service provider networks, A router or a gateway can be enabled to act as a DHCP server. Within a local network, a DHCP server assigns a local IP address to each device connected to the network.

Another related protocol is Remote Authentication Dial-in User Service (RADIUS). Specifically, RADIUS is a networking protocol, operating on port 1812 that provides centralized Authentication, Authorization, and Accounting management for users who connect and use a network service. Because of the broad support and the ubiquitous nature of the RADIUS protocol, it is often used by Internet service providers (ISPs) and enterprises to manage access to the Internet or internal networks, wireless networks, and integrated e-mail services. These networks may incorporate modems, digital subscriber line (Da), access points, VPNs, network ports, web servers, etc. RADIUS is a client/server protocol that funs in the application layer, and can use either Transmission Control Protocol (TCP) or User Datagram Protocol (UDP) as transport. Network access servers, the gateways that control access to a network, usually contain a RADIUS client component that communicates with the RADIUS server. RADIUS is often the back-end of choice for IEEE 802.1X authentication as well.

IEEE 802.1X is an IEEE Standard for port-based Network Access Control (PNAC). It is part of the IEEE 802.1 group of networking protocols. It provides an authentication mechanism to network devices wishing to attach to a LAN or WLAN.

Thus, in one or more embodiments of the invention, IP addresses may be assigned in contiguous ranges by: receiving, by a gateway from a device, a request for an Internet Protocol (IP) address of a plurality of IP addresses; determining, by the gateway, whether the device is an access point; in response to determining that the device is an access point, assigning by the gateway, the IP address to the device from a first contiguous range of the plurality of ZIP addresses; in response to determining that the device is not an access point, assigning, by the gateway, the IP address to the device from a second contiguous range of the plurality of IP addresses, wherein the first contiguous block and the second contiguous block are separate; after assigning and by the gateway, enforcing a policy for the device based on the IP address of the device.

Referring now to the drawings, FIG. 1 is a block diagram of an example system 100 for contiguous IP address allocation. FIG. 1 includes gateway 105, and network devices 120A and 120B. Gateway 105 further includes DHCP functionality 110, and network application 120.

In the example of FIG. 1, gateway 105 includes at least one processing resource (not shown) and at least one machine-readable medium (not shown) comprising (e.g., encoded with) instructions that are executable by the at least one processing resource of gateway 105 to implement functionalities described herein. Gateway 105 may be any suitable device including, but not limited to, an access point, a server, a computer, a router, a switch, etc.

In the example of FIG. 1, DHCP functionality 110 includes any functionality normally performed by a DHCP server or otherwise used during use of the DHCP protocol and/or related functionalities. In particular, DHCP functionality 110 is able to allocate specific IP addresses to specific network devices. In other words, DHCP functionality 110 will, when instructed, allocate an IP address from a contiguous range of IP address to a particular network device. The IP addresses may be allocated in any manner now known or later developed. The instruction may come in the form of a tag or attribute in the DHCP Request, or in any other suitable manner. Network application 120, as discussed below, may append the tag or attribute to the DHCP Request. DHCP functionality 110 may include any other functionality needed to implement the invention as described herein.

In the example of FIG. 1, network application 120 may be one or more applications executed by gateway 105. Although network application 120 is shown as executing on a single gateway, network application 120 may execute on multiple devices simultaneously, and is not limited to being executed by a gateway—any suitable device or devices may execute network application 120. The functionalities of network device 120, as discussed below, may be performed solely by network application 120 or may be performed in conjunction with, or by, other applications, as would be apparent to one of ordinary skill in the art.

In the example of FIG. 1, network application 120 includes programming or functionality to determine ranges of contiguous IP addresses. The ranges may be determined at any time, by any suitable entity or process, and may include as many different ranges as desired. For example, an administrator or manufacturer may determine the ranges of contiguous IP addresses to be used. Alternatively, any other entity or method may be used. There may be any number of contiguous ranges, such as 2, 3, 4, or more. For example, 3 ranges may be used for: 1.) Access Points, 2.) registered client device, 3.) guest client devices. To continue the example, range 1 (access points only) may include IP address 192.168.1.1 to 192.168.1.50, range 2. (registered client devices) may include IP addresses 192.168.1.51 to 192.168.1.150, and range 3 (guest client devices) may include IP addresses 192.168.1.151 to 192.168.1.254.

Many other groupings may be used, as will be apparent to one of ordinary skill in the art. Generally, the ranges of contiguous IP addresses will be determined before the network is in use, but they may also be determined as the network is operating. The determined ranges may be stored in any suitable format at any suitable location, and may be updated or changed at any time.

In the example of FIG. 1, network application 120 includes programming or functionality to receive a request for an IP address from a network device. The request may be sent to a DHCP server, such as one operating on gateway 105, and intercepted or otherwise received by network application 120. Network application 120 may receive the request in any format, at any time, using any manner or method now known or later developed.

In the example of FIG. 1, network application 120 includes programming or functionality to determine what type of device the network device is. The determination may be based on the results of a RADIUS authentication. The RADIUS Accept message may include information about the type of the device in the Vendor Specific Attribute (VSA). Alternatively, the information may be included in another part of the RADIUS Accept message. Further the information relating to the type of device may be included in any other message or received in any other suitable way. The determination may be made in any suitable manner. The determination may be of any granularity. For example, the determination may be whether the network device is an access point or not. Or, the determination may be whether the network device is an access point, a registered client device, or a guest client device. It will be apparent to one of ordinary skill in the art that there are many different determinations that may be made as to the type of device that network device is and, as such, the invention should not be limited to the examples discussed herein.

In the example of FIG. 1, network application 120 includes programming or functionality to assign IP addresses to network devices. The IP addresses may be assigned by, or with assistance from, DHCP functionality 110, as discussed above. Regardless of which component performs the assigning, the IP addresses are assigned from the network device's associated contiguous IP address ranges. The specific IP addresses assigned from the contiguous range may be selected in any suitable manner.

In the example of FIG. 1, network application 120 includes programming or functionality to enforce one or more policies based on the IP address of a network device. The policies may be related to anything. For example, the policies may relate to bandwidth usage, redirection of traffic, allowing all or types of network traffic, denying all or types of network traffic, network address translation (NAT), permissions, security, etc. It will be apparent to one of ordinary skill in the art that many different policies may be enforced and, as such, the invention should not be limited to the above examples. The policies may be enforced in any manner now known or later developed.

In the example of FIG. 1, network device 120A and 120B include at least one processing resource (not shown) and at least one machine-readable medium (not shown) comprising (e.g., encoded with) at least instructions 122 that are executable by the at least one processing resource of network device 120A, 120B to implement functionalities described herein.

In the example of FIG. 1, network device 120A, 120B may engage in any network data transmission operations, including, but not limited to, switching, routing, bridging, or a combination thereof. In some examples, network device 120A, 120B may comprise a wireless access point (WAP). In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network device 120A, 120B may be any suitable type(s) of network devices made by any suitable manufacturer(s).

Alternatively, network device 120A, 120B, may be a laptop computer, a desktop computer, a mobile device, and/or other wireless devices, although examples of the disclosure are not limited to such devices. In examples described herein, a mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices. Network device 120A, 120B is communicatively connected to gateway 105 using a wired and/or wireless connection, via any suitable protocol or technology.

Figure 2:
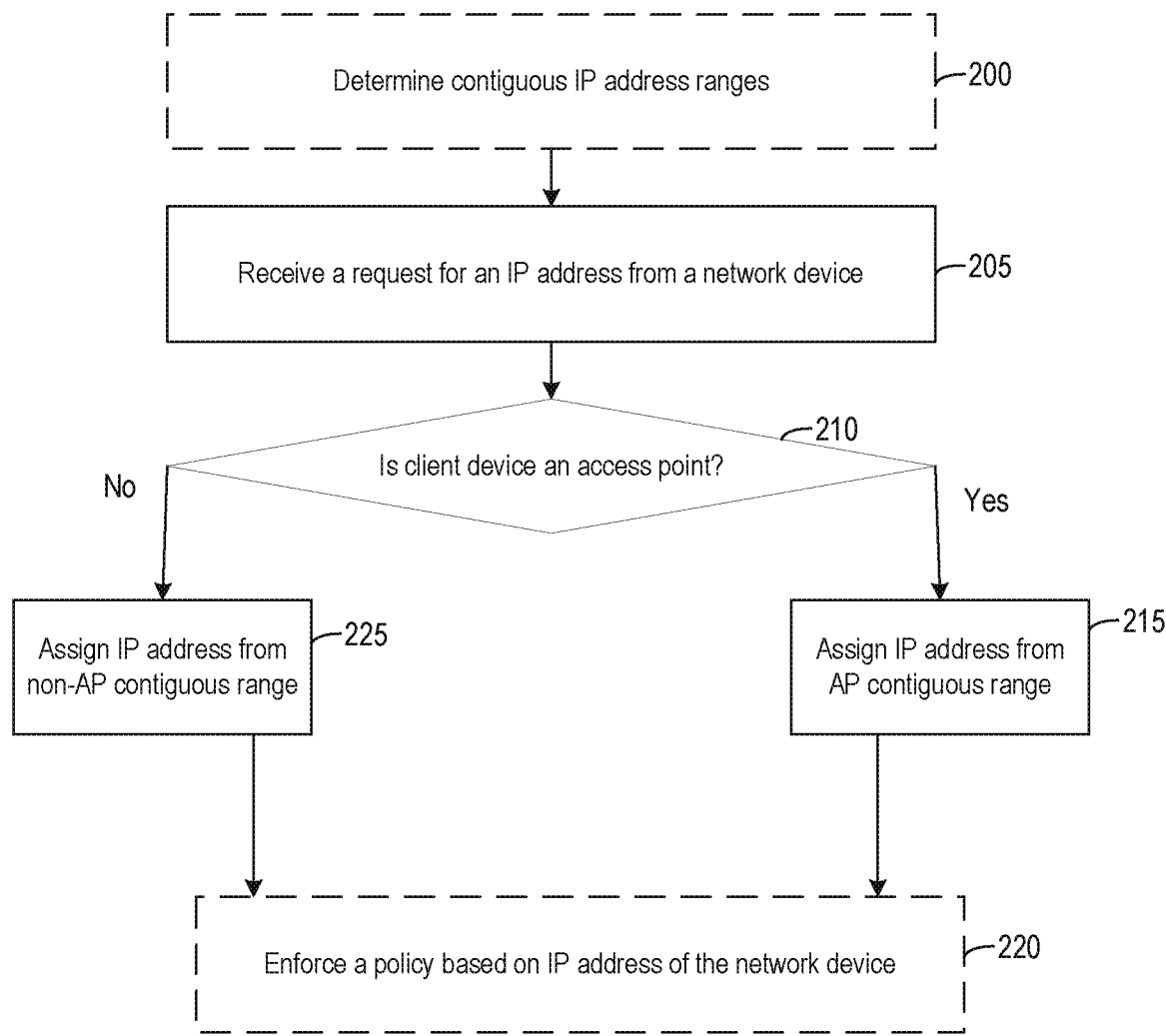
FIG. 2 is flowchart of a method in accordance with one or more embodiments.

FIG. 2 shows a flowchart of a method for contiguous IP address allocation, according to one example. FIG. 2 may be implemented as a method or may be executed as one or more instructions on a machine (e.g., by at least one processor), where the one or more instructions are included on at least one non-transitory machine-readable storage medium. While FIG. 2 is shown in an order, the steps of FIG. 2 may be performed in any order, at any time, and are not limited to the configuration shown in FIG. 2.

In step 200, contiguous IP address ranges are determined, in accordance with one or more embodiments. As indicated by the dotted line, the contiguous IP address ranges may be determined at any time. The ranges may be of any size, and may be tagged for any type, user, and/or status of device. The determination may be stored in any manner on any suitable device(s). There may be any number of contiguous IP address ranges, such as 2, 3, 5, or more. Each contiguous range may be of the same size, a different size, or a combination thereof.

In step 205, a request is received from a network device for an IP address, in accordance with one or more embodiments. The request may be received at any time, from any network device. The request may be a new request, a renew, or any other suitable type of request. The request may be received in any format by any suitable device and/or application.

In step 210, a determination is made whether the network device is an access point. If the network device is an access point, then the method proceeds to step 215. If the network device is not an access point, the method proceeds to step 225. The determination may be made in any manner now known or later developed, and may be based on any available information, such as the result of a RADIUS authentication, or other source.

Although FIG. 2 shows the determination as whether or not the network device is an access point, the invention is not so limited. The determination in step 210 may be any determination, between any status of device, type of device, user, etc. It will be apparent to one of ordinary skill in the art that many determinations may be made and, as such, the invention should not be limited to the above examples.

In step 215, an IP address is assigned from the contiguous range of IP addresses associated with APs. Any available IP address from the contiguous range may be assigned. For example, a next available IP address may be assigned (i.e., 192.168.1.5 was assigned to the prior AP, then 192.168.1.6 will be assigned to the current AP). Alternatively, the IP addresses may be assigned randomly from the contiguous range, or may be assigned in any other suitable manner.

In step 220, a policy is enforced based on the IP address of the network device. The policy may be enforced in any manner now known or later developed. The policy may be any type of policy such a security policy, a bandwidth policy, a privileges policy, a NAT policy, a whitelist, a blacklist, etc.

In step 225, an IP address is assigned from the contiguous range of IP addresses not associated with APs. Any available IP address from the contiguous range may be assigned. For example, a next available IP address may be assigned (i.e., 192.168.1.8 was assigned to the prior non-AP device, then 192.168.1.9 will be assigned to the current non-AP device). Alternatively, the IP addresses may be assigned randomly from the contiguous range, or may be assigned in any other suitable manner.

Figure 3:
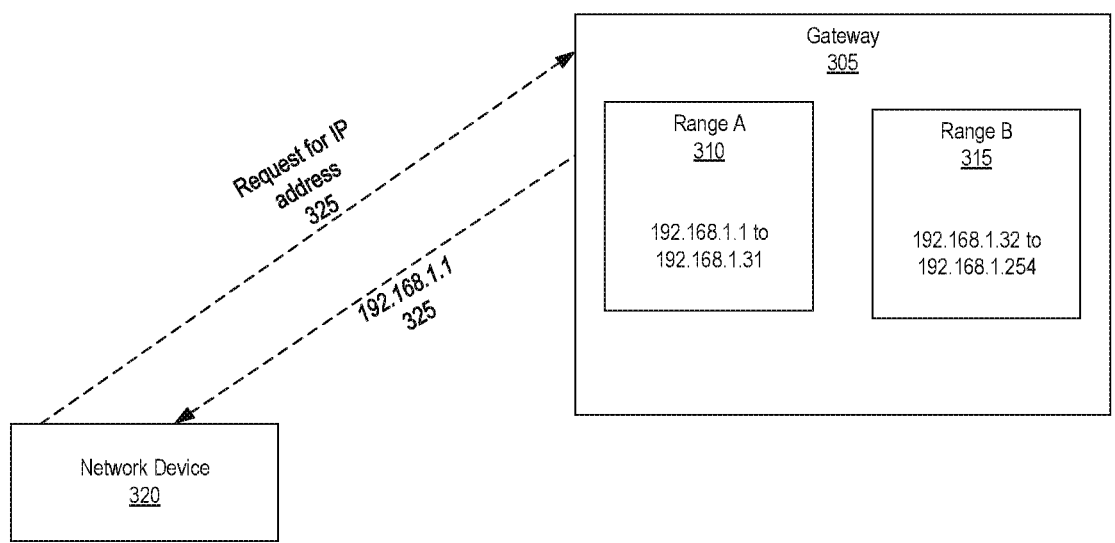
FIG. 3 is an example of contiguous allocation of IP addresses in accordance with one or more embodiments.

FIG. 3 shows an example of contiguous IP address allocation in accordance with one or more embodiments. To aid in the understanding of the invention a specific example is discussed but the invention should not be limited to the specific example below.

In FIG. 3, gateway 305 has been configured with two different contiguous IP address ranges: Range A 310 and Range B 315. Range A 310 is designated for APs, and consists of all IP addresses from 192.168.1.1 to 192.168.1.31, while Range B 315 is designated for client devices, and consists of all IP addresses from 192.168.1.32 to 192.1681254.

The example of FIG. 3 begins when network device 320 requests an IP address 325. Gateway does not know what type of device network device 320 is at this point in time. While network device 320 is authenticating, the authentication service returns an indication in the Vendor Specific Attribute (VSA) that network device 320 is an access point. Thus, gateway 305 returns the IP address 192.168.1.1325 to network device 320.

Subsequently, network device 320 uses 192.168.1.1 as its IP address. Gateway 305 is then able to enforce AP specific policies on network device 320 simply by checking the IP address of the traffic.

Figure 4:
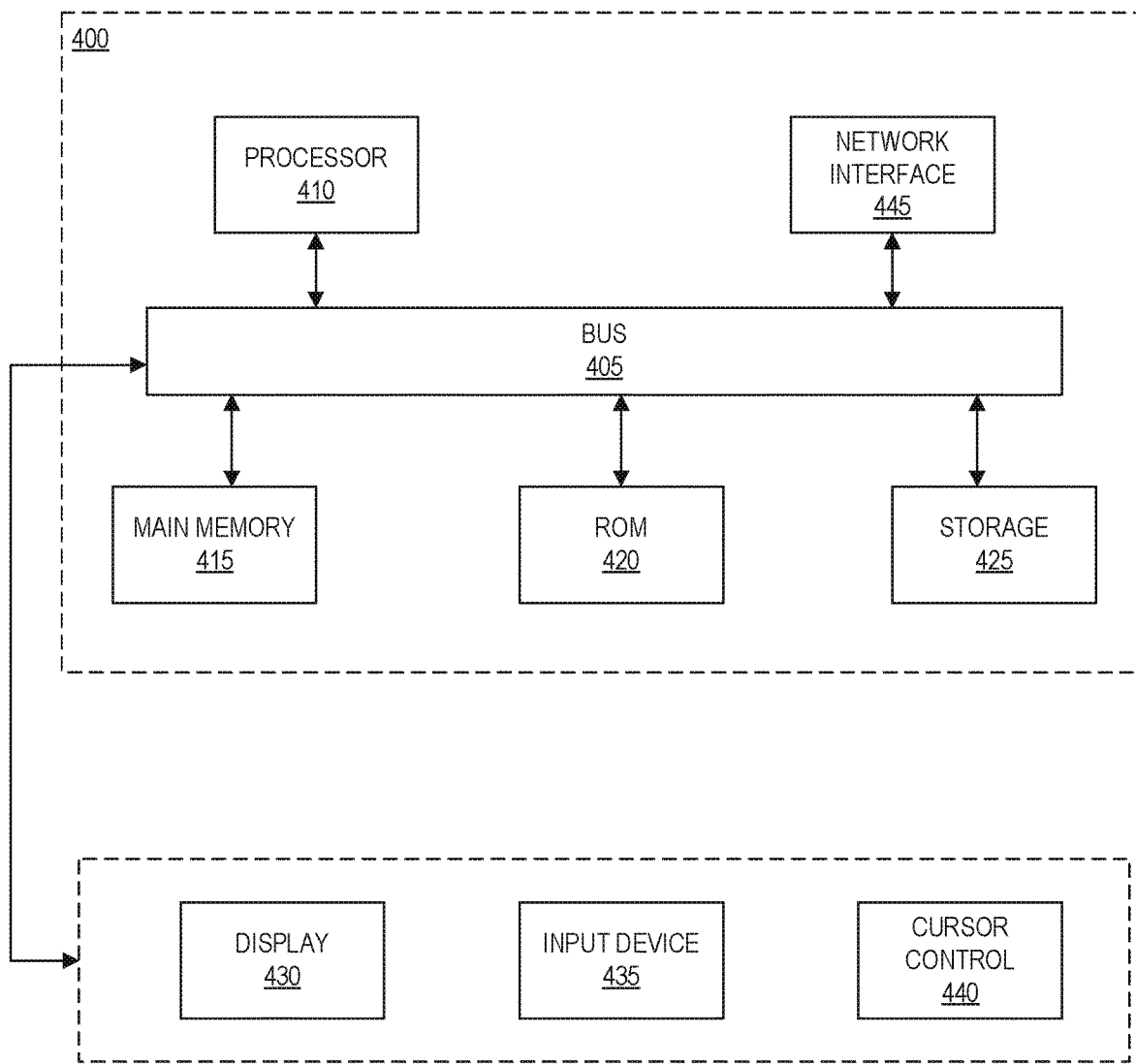
FIG. 4 is a block diagram of an example computer system in which various embodiments described herein may be implemented.

FIG. 4 is a block diagram of an example computer system 400 in which various embodiments described herein may be implemented.

Computer system 400 includes bus 405 or other communication mechanism for communicating information, at least one hardware processor 410 coupled with bus 405 for processing information. At least one hardware processor 410 may be, for example, at least one general purpose microprocessor.

Computer system 400 also includes main memory 415, such as random access memory (RAM), cache, other dynamic storage devices, or the like, or a combination thereof, coupled to bus 405 for storing information and one or more instructions to be executed by at least one processor 410. Main memory 415 also may be used for storing temporary variables or other intermediate information during execution of one or more instructions to be executed by at least one processor 410. Such one or more instructions, when stored on storage media accessible to at least one processor 410, render computer system 400 into a special-purpose machine that is customized to perform the operations specified in the one or more instructions.

Computer system 400 may further include read only memory (ROM) 420 or other static storage device coupled to bus 405 for storing static of one or more instructions to be executed by at least one processor 410. Such one or more instructions, when stored on storage media accessible to at least one processor 410, render computer system 400 into a special-purpose machine that is customized to perform the operations specified in the one or more instructions.

Computer system 400 may further include information and one or more instructions for at least one processor 410. At least one storage device 425, such as a magnetic disk, optical disk, or USB thumb drive (Flash drive), or the like, or a combination thereof, may be provided and coupled to bus 405 for storing information and one or more instructions.

Computer system 400 may further include display 430 coupled to bus 405 for displaying a graphical output to a user. The computer system 400 may further include input device 435, such as a keyboard, camera, microphone, or the like, or a combination thereof, coupled to bus 405 for providing an input from a user. Computer system 400 may further include cursor control 440, such as a mouse, pointer, stylus, or the like, or a combination thereof, coupled to bus 405 for providing an input from a user.

Computer system 400 may further includes at least one network interface 445, such as a network interface controller (NIC), network adapter, or the like, or a combination thereof, coupled to bus 405 for connecting computer system 400 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 based on (e.g., in response to) at least one processor 410 executing one or more sequences of one or more instructions contained in main memory 415. Such one or more instructions may be read into main memory 415 from another storage medium, such as at least one storage device 425. Execution of the sequences of one or more instructions contained in main memory 415 causes at least one processor 410 to perform the process steps described herein. In alternative embodiments, hard-wired circuitry may be used in place of or in combination with software instructions.

In examples described herein, the term "Wi-Fi" is meant to encompass any type of wireless communications that conforms to any IEEE 802.11 standards, whether 802.11ac, 802.11ad, 802.11ay, 802.11ax, 802.11g, etc. The term "Wi-Fi" is currently promulgated by the Wi-Fi Alliance®. Any products tested and approved as "Wi-Fi Certified" (a registered trademark) by the Wi-Fi Alliance® are certified as interoperable with each other, even if they are from different manufacturers. A user with a "Wi-Fi Certified" (a registered trademark) product can use any brand of WAP with any other brand of client hardware that also is certified. Typically, however, any Wi-Fi product using the same radio frequency band (e.g., 5 GHz band for 802.11ac) will work with any other, even if such products are not "Wi-Fi Certified." The term "Wi-Fi" is further intended to encompass future versions and/or variations on the foregoing communication standards. Each of the foregoing standards is hereby incorporated by reference.

In examples described herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method comprising:
   managing network device operations in a non-virtual local area network (non-VLAN) environment by receiving, by a gateway from a network device, a request for an Internet Protocol (IP) address of a plurality of IP addresses;
   determining, by the gateway, whether the network device is an access point that allows a wireless device to connect to a wired network associated with the network environment;
   in response to determining that the network device is an access point, assigning by the gateway, the IP address to the network device from a first contiguous range of the plurality of IP addresses;
   in response to determining that the network device is not an access point, assigning, by the gateway, the IP address to the network device from a second contiguous range of the plurality of IP addresses, wherein the first contiguous range and the second contiguous range are separate;
   after assigning and by the gateway, enforcing a policy for the network device based on the IP address of the network device.

2. The method of claim 1, wherein determining further comprises determining whether the network device is an access point or a client device.

3. The method of claim 2, wherein determining further comprises determining whether the client device is registered or a guest.

4. The method of claim 3, wherein the client device is assigned the IP address from the second contiguous range when the client device is registered, and wherein the client device is assigned the IP address from a third contiguous range of the plurality of IP addresses when the client device is the guest.

5. The method of claim 1, wherein the policy limits bandwidth.

6. The method of claim 1, wherein the policy redirects traffic.

7. The method of claim 1, wherein the gateway is a router.

8. A system comprising:
   a gateway operating in a non-virtual local area network (non-VLAN) environment, comprising a processor and a memory, the memory storing instructions which, when executed by the processor, cause the gateway to:
   receive, from a network device, a request for an Internet Protocol (IP) address of a plurality of IP addresses;
   determine whether the network device is an access point that allows a wireless device to connect to a wired network associated with the network environment;
   in response to determining that the network device is an access point, assigning the IP address to the network device from a first contiguous range of the plurality of IP addresses;
   in response to determining that the network device is not an access point, assigning the IP address to the network device from a second contiguous range of the plurality of IP addresses, wherein the first contiguous range and the second contiguous range are separate;
   after assigning, enforcing a policy for the network device based on the IP address of the network device.

9. The system of claim 8, wherein determining further comprises determining whether the network device is an access point or a client device.

10. The system of claim 9, wherein determining further comprises determining whether the client device is registered or a guest.

11. The system of claim 10, wherein the client device is assigned the IP address from the second contiguous range when the client device is registered, and wherein the client device is assigned the IP address from a third contiguous range of the plurality of IP addresses when the client device is the guest.

12. The system of claim 8, wherein the policy limits bandwidth.

13. The system of claim 8, wherein the policy redirects traffic.

14. The system of claim 8, wherein the gateway is a router.

15. A non-transitory computer readable medium storing instructions which, when executed by a processor, cause the processor to:
   receive, from a network device operating in a non-virtual local area network (non-VLAN) environment, a request for an Internet Protocol (IP) address of a plurality of IP addresses;
   determine whether the network device is an access point that allows a wireless device to connect to a wired network associated with the network environment;
   in response to determining that the network device is an access point, assigning the IP address to the network device from a first contiguous range of the plurality of IP addresses;
   in response to determining that the network device is not an access point, assigning the IP address to the network device from a second contiguous range of the plurality of IP addresses, wherein the first contiguous range and the second contiguous range are separate;
   after assigning, enforcing a policy for the network device based on the IP address of the network device.

16. The non-transitory computer readable medium of claim 15, wherein determining further comprises determining whether the network device is an access point or a client device.

17. The non-transitory computer readable medium of claim 16, wherein determining further comprises determining whether the client device is registered or a guest.

18. The non-transitory computer readable medium of claim 17, wherein the client device is assigned the IP address from the second contiguous range when the client device is registered, and wherein the client device is assigned the IP address from a third contiguous range of the plurality of IP addresses when the client device is the guest.

19. The non-transitory computer readable medium of claim 15, wherein the policy limits bandwidth.

20. The non-transitory computer readable medium of claim 15, wherein the policy redirects traffic.

* * * * *